United States Patent [19]

Divine et al.

[11] 4,028,683
[45] June 7, 1977

[54] MEMORY PATCHING CIRCUIT WITH COUNTER

[75] Inventors: Charles Hamman Divine, Thornton; John Francis O'Neill, Boulder, both of Colo.

[73] Assignee: Bell Telephone Laboratories, Incorporated, Murray Hill, N.J.

[22] Filed: Oct. 16, 1975

[21] Appl. No.: 622,939

[52] U.S. Cl. .......................................... 340/172.5
[51] Int. Cl.² .................................... G06F 13/00
[58] Field of Search ................................ 340/172.5

[56] References Cited
UNITED STATES PATENTS 3,934,227  1/1976  Worst ............................ 340/172.5

Primary Examiner—Gareth D. Shaw
Assistant Examiner—C. T. Bartz
Attorney, Agent, or Firm—Donald M Duft

[57] ABSTRACT

A read only memory (ROM) patching arrangement is disclosed for providing valid output information whenever ROM word locations containing invalid information are addressed. The disclosed arrangement uses a plurality of small capacity PROMs as a decoder to detect the receipt of each address word representing a defective ROM locaton. Upon each detection of a defective address, the decoder temporarily inhibits the output of the ROM and causes a small auxiliary memory to output valid program information as a substitute for that in the defective ROM location. A counter is used as a supplemental addressing source for both the decoder and the auxiliary memory. This increases the patching capability by subdividing the decoder and the auxiliary memory into $2^n$ segments where n is the number of bits supplied by the counter.

14 Claims, 5 Drawing Figures

FIG. 2

| PATCH NO. | ADDRESS BITS A2 A1 A0 | COUNTER OUTPUT BITS C2 C1 C0 | PROM 1 OUTPUT BITS 7 6 5 4 3 2 1 0 |
|---|---|---|---|
| 0 | 0 0 1 | 0 0 0 | 0 0 0 0 0 0 0 1 |
| 1 | 0 1 1 | 0 0 0 | 0 0 0 0 0 0 1 0 |
| 2 | 0 1 0 | 0 0 0 | 0 0 0 0 1 1 0 0 |
| 3 | 0 1 0 | 0 0 0 | 0 0 0 0 1 1 0 0 |
| 4 | 1 0 1 | 0 0 0 | 0 0 0 1 0 0 0 0 |
| 5 | 1 1 0 | 0 0 0 | 0 0 1 0 0 0 0 0 |
| 6 | 1 0 0 | 0 0 0 | 0 1 0 0 0 0 0 0 |
| 7 | 1 1 1 | 0 0 0 | 1 0 0 0 0 0 0 0 |

FIG. 3

| PATCH NO. | ADDRESS BITS A5 A4 A3 | COUNTER OUTPUT BITS C2 C1 C0 | PROM 2 OUTPUT BITS 7 6 5 4 3 2 1 0 |
|---|---|---|---|
| 0 | 0 1 0 | 0 0 0 | 0 0 0 0 0 0 0 1 |
| 1 | 1 1 0 | 0 0 0 | 0 0 0 0 0 0 1 0 |
| 2 | 1 0 0 | 0 0 0 | 0 0 0 0 0 1 0 0 |
| 3 | 0 0 1 | 0 0 0 | 0 0 0 0 1 0 0 0 |
| 4 | 0 0 0 | 0 0 0 | 0 0 0 1 0 0 0 0 |
| 5 | 1 0 1 | 0 0 0 | 0 0 1 0 0 0 0 0 |
| 6 | 0 1 1 | 0 0 0 | 0 1 0 0 0 0 0 0 |
| 7 | 1 1 1 | 0 0 0 | 1 0 0 0 0 0 0 0 |

FIG. 4

| PATCH NO. | ADDRESS BITS A8 A7 A6 | COUNTER OUTPUT BITS C2 C1 C0 | PROM 3 OUTPUT BITS 7 6 5 4 3 2 1 0 |
|---|---|---|---|
| 0 | 1 0 0 | 0 0 0 | 0 0 0 0 0 0 0 1 |
| 1 | 0 1 1 | 0 0 0 | 0 0 0 0 0 0 1 0 |
| 2 | 0 0 0 | 0 0 0 | 0 0 0 0 0 1 0 0 |
| 3 | 0 1 0 | 0 0 0 | 0 0 0 0 1 0 0 0 |
| 4 | 1 0 1 | 0 0 0 | 0 0 0 1 0 0 0 0 |
| 5 | 0 0 1 | 0 0 0 | 0 0 1 0 0 0 0 0 |
| 6 | 1 1 0 | 0 0 0 | 0 1 0 0 0 0 0 0 |
| 7 | 1 1 1 | 0 0 0 | 1 0 0 0 0 0 0 0 |

FIG. 5

| PATCH NO. | ADDRESS BITS A11 A10 A9 | COUNTER OUTPUT BITS C2 C1 C0 | PROM 4 OUTPUT BITS 7 6 5 4 3 2 1 0 |
|---|---|---|---|
| 0 | 0 0 0 | 0 0 0 | 0 0 0 0 0 0 0 1 |
| 1 | 0 1 1 | 0 0 0 | 0 0 0 0 0 0 1 0 |
| 2 | 0 1 0 | 0 0 0 | 0 0 0 0 0 1 0 0 |
| 3 | 1 0 0 | 0 0 0 | 0 0 0 0 1 0 0 0 |
| 4 | 1 0 1 | 0 0 0 | 0 0 0 1 0 0 0 0 |
| 5 | 1 1 0 | 0 0 0 | 0 0 1 0 0 0 0 0 |
| 6 | 1 1 1 | 0 0 0 | 0 1 0 0 0 0 0 0 |
| 7 | 0 0 1 | 0 0 0 | 1 0 0 0 0 0 0 0 |

MEMORY PATCHING CIRCUIT WITH COUNTER

BACKGROUND OF THE INVENTION

1. Field of the Invention

This invention relates to a patching facility for unalterable memories of the type used in electronic computers and processors. More particularly, the invention relates to a memory patching facility which furnishes good output information whenever an attempt is made to access word locations containing defective or invalid information in an unalterable memory.

2. Description of the Prior Art

It is known to use unalterable read only memories (ROMs) in processors, computers, and other such applications requiring the storage of permanent type information. Although ROMs, in particular semiconductor ROMs, are efficient unalterable information storage devices, their use presents problems whenever it becomes necessary to change the stored information. For example, a machine using a ROM may be manufactured, tested, delivered, installed in service, and perform satisfactorily for an extended period of time. A machine malfunction may subsequently occur because of defective program information in the ROM. This defective information may be due either to a subtle defect in the program as originally written; or it may result from a newly developed defect within the ROM device.

In view of the above, it is a common problem for program errors to be discovered in ROM controlled machines and for the owner of the machine to be faced with the problem of promptly correcting the error to minimize the machine downtime.

This problem could be easily solved if the realities of semiconductor ROM technology and economics were of no concern. Conceivably, the problem could be solved by replacing the defective ROM with a new ROM programmed with the correct information. However, this solution is neither feasible nor economical. First of all, the typical semiconductor ROM can only be programmed at the factory with the programming comprising a portion of the manufacturing process. Consequently, a machine user cannot promptly obtain a newly programmed ROM. Instead he must contact the ROM manufacturer, give the manufacturer the corrected program information, and then wait for the manufacturer to produce and deliver the new ROM. Also, because the ROM programming is done by the manufacturer on a customized basis, a manufacturer cannot economically produce one or two new ROMs for a single customer. ROMs are economical only when fabricated in reasonably large quantities. For these reasons, the downtime of a machine cannot normally be minimized by replacing a defective ROM with a new one having corrected program information.

Field programmable ROMs (PROMs) are commercially available for immediate delivery. Conceivably, an installed machine having a defective ROM could be returned to service by programming a PROM with good information, and by then replacing the defective ROM with the newly programmed PROM. This would be technically feasible, but economically unsatisfactory, for most applications. The reason for this is that PROm devices are approximately 10 times the cost of comparable ROMs. This expedient might be satisfactory, in spite of the economic penalty, in installations where the cost of the PROM is low compared to the cost to the user of the down condition of the machine. However, many installations could not tolerate the cost penalty. For example, a telephone company or a computer manufacturer having thousands of machines in service possibly could not afford the mass replacement of defective ROMs with PROMs costing ten times as much.

Attempts have been made in the prior art to solve the problem of defective information in unalterable memories. Most of the prior art solutions require the use of equipment that is complicated and expensive, such as the provision of a fully duplicated memory system. One prior art arrangement comprises a decoder which detects the receipt of each memory address word specifying a defective ROM location, generates a control signal to inhibit the output of the defective ROM, and activates an alterable auxiliary memory which then supplies valid program information. A system of this type is shown in U.S. Pat. No. 3,638,194 issued on Jan. 25, 1972 to Matushita et al.

Matushita uses a diode matrix array as the auxiliary memory. This memory can be field programmed by inserting diodes into sockets of the matrix crosspoints required to generate the new program information. The Matushita system may be suitable for use in application where space is not at a premium and where the ROM memory is of limited capacity. However, it is unsuitable with present state of the art systems using integrated circuits including ROM memories and other such devices of the postage stamp size where space is at a premium. Also, the Matushita arrangement would be costly for use with a large capacity ROM since the auxiliary memory presumably would have to have the same bit capacity as the defective ROM. In this case it would merely comprise another duplicated memory arrangment.

It is therefore, a problem to maintain program controlled machines in service when program defects are discovered in the ROMs of such machines.

SUMMARY OF THE INVENTION

Objects

An object of the invention is to provide memory patching facilities for stored program controlled machines using ROMs.

A further object is to provide memory patching facilities which are activated to output good information whenever ROM word locations containing defective information are addressed.

Summary Description

The present invention comprises an improved patching facility for ROMs. The provided equipment includes a PROM decoder for detecting the receipt of address words representing defective ROM locations and for generating an output signal representing each such address word, a small capacity auxiliary memory for storing the valid program information that is to be used in place of that in the defective ROM locations, and an encoder interposed between the decoder and the auxiliary memory for addressing the memory whenever a decoder output is received specifying a ROM location that is to be patched.

Inputs of the PROM decoder and the ROM are both connected to the memory address bus of the system of which the ROM is a part. The decoder thereby receives each address word applied to the ROM, detects the receipt of each word representing a defective ROM location and generates an output signal representing the defective location. This signal is in 1-out-of-n form and it is applied to the one of the plurality of decoder output conductors that is associated with the patched address. Each decoder output conductor represents a different defective ROM location that is to be patched. The encoder receives this 1-out-of-n signal, converts it to binary and transmits the binary information to the auxiliary memory as address information. This binary information is used along with other information to specify the word location in the auxiliary memory that stores the valid program information that is to be used in place of that in the defective ROM location.

The encoder also generates a gating signal whenever an output signal is received from the decoder. This gating signal inhibits the output of the ROM memory and activates the output of the auxiliary memory so that the good information stored in the auxiliary memory will be used by the system at this time in place of that defective ROM location.

A copending concurrently filed application in the name of J. C. Moran, Ser. No. 623,133 filed Oct. 16, 1975, discloses a ROM patching arrangement which uses a plurality of small capacity PROMs to decode ROM address information applied to a multiconductor system memory address bus and to provide a unique output signal for each detected address word associated with a defective ROM location that is to be patched. For example, let it be assumed that there are twelve conductors in the memory address bus extending to the inputs of the ROM. In this case, one possible embodiment of the Moran invention could comprise three 16 × 8 PROMs in the decoder to provide eight patches i.e., facilities for detecting eight different ROM address words representing eight defective ROM locations. The term 16 × 8 specifies that each PROM has sixteen different eight bit word locations.

Each such PROM, as shown by Moran, has four address inputs with each input being connected to a different conductor of the 12 bit system address bus. The four inputs of the first PROM are connected to the first four address bus conductors, the four inputs of the second PROM are connected to the next four address bus conductors, and the four inputs of the third PROM are connected to the last four bus conductors. Each PROM stores 8 bit words, each PROM has eight output conductors, and the eight output conductors of each PROM are wired in parallel to the corresponding output conductors of the other PROMs.

PROM 1, the first PROM, is programmed so that a 1 is written into the first or rightmost bit position of the word location in the PROM that is addressed by bits 0 through 3 of the address of the first ROM word to be patched. Likewise, a 1 is written into the first bit position of the word location in PROM 2 that is addressed by bits 4 through 7 of the address of the first ROM word to be patched. This procedure is repeated with respect to PROM 3 using address bits 8 through 11.

The operation of the Moran circuit is such that all PROMs output an 8 bit word having a 1 in the same bit position whenever the address of a ROM location to be patched is received from the system address bus. Each output bit corresponds to one possible patch and the paralleled PROM outputs provide a 1-out of-8 code identifying each patch. The paralleling of the corresponding output conductors of each PROM comprises a hardwired AND circuit so that each paralleled output conductor can go high only when a 1 appears in the corresponding bit position of each PROM for the currently addressed word. With this arrangement, when the first patched ROM address appears on the system address bus, all three PROMs will have a 1 in the first bit position, the output conductor for this bit position in each PROM will go high, and this high signal will indicate the reception of the first patched address word.

Each decoder output signal in the Moran system is applied in 1-out of-8 form to the encoder and converted into a 3-bit binary word. This binary word is then applied as address information to the auxiliary memory to specify the word location in the memory that is to be used at this time in place of the defective information in the ROM.

When a ROM address which has not been patched is received, the paralleled PROM outputs in the Moran system are zero for all positions (bit orders) since, at this time, a 1 does not appear in any of the corresponding bit orders for all PROMs. This holds all of the 8 paralleled decoder output conductors at a low potential and indicates that the received address word has not been patched. The system then uses the information stored in the currently addressed ROM location.

The use of a plurality of PROMs of relatively low capacity, such as three 16 × 8 PROMs as shown by Moran, is economically preferable over the use of a single PROM having a number of inputs equal to the number of conductors in the address bus since the cost of PROMs is related to their bit capacity. A PROM having twelve input conductors would have 4,096 ($2^{12}$) word locations. The use of three small PROMs is cheaper since a PROM having four address conductors will have only 16 ($2^4$) word locations; the three decoder PROMs together will have only 48 word locations. Thus, Moran provides a patching arrangement that is economically feasible and preferable to the physical replacement of the defective ROM or the use of other and more complicated solutions.

Although the Moran arrangement represents a significant advancement in the art, the number of patches that it can provide is defined or limited by the number of binary bits (the bit width) in each PROM word location, rather than by the number of word locations in the PROMs. Thus, Moran's use of three 16 × 8 PROMs limits the number of patches to eight since each PROM is eight bits wide.

A copending concurrently filed application in the name of C. H. Divine, Ser. No. 622,938, filed Oct. 16, 1975, discloses a ROM patching arrangement which is somewhat similar to Moran's but which can provide additional patching capacity with a minimum of device modification. This is accomplished by connecting at least one of the memory address bus conductors to an input of each of the plurality of decoder PROMs as well as to an address input of the auxiliary memory. The connection of a single memory address bus conductor in this manner effectively doubles in patching capacity over that shown by Moran. For example, if a plurality of PROMs having an eight bit width are used, this expedient provides facilities for sixteen rather than eight output patches.

The teaching of Divine can be extended to more than one memory address conductor to provide still greater patching capacity. For example, if two memory address bus conductors are connected to each of the decoder PROM inputs as well as to an address input of the auxiliary memory, then 8 × 2 × 2 or 32 different patches may be provided. Similarly, if three memory address bus conductors are connected in this manner, then 64 patches may be provided.

The Divine patching arrangement is an improvement over that shown by Moran in that it provides for increased patching capability from decoder PROMs of the type that are commercially available. The Divine arrangement, however, has its limitations in that the full patching capability of the decoder PROMs cannot be realized unless the ROM addresses to be patched are evenly distributed to the sectors or portions of each PROM defined by the binary value of the address bus conductor or conductors that are connected to each PROM as well as to the address input of the auxiliary memory. For example, if a single address bus conductor is so connected, and if this bus conductor is assumed to represent the lowest bit order of the address, then half of the patched addresses must have a binary 0 and the other half must have a binary 1 in their lowest bit order. This obviously would be a fortuitous occurrence and, therefore, the maximum theoretical patching capacity of the Divine arrangement often might not be obtained.

The present invention overcomes this limitation by providing an N stage or plural order binary counter having output conductors extending separately from each stage or order to separate address inputs of each PROM as well as to address inputs of the auxiliary memory. The conductors of the system memory address bus extend to separate inputs of the decoder PROMs as taught by Moran. Thus, the PROMs are jointly addressed by the address bus information as well as by the output signals from the counter. The counter output signals effectively subdivides each of the decoder PROMs and the auxiliary memory into $2^N$ sectors or sections so that N sets of eight patches may be provided by decoder PROMs having an 8-bit width, for example.

Let it be assumed for example that N = 1 and that the counter is of the 1-bit type in which its output can alternatively be a 0 or a 1. The resulting arrangement would then be analogous to that shown by Divine in which one memory address bus conductor is connected to each PROM and to the auxiliary memory. This would permit two sets of 8 patches to be detected. Similarly, N could equal 2 or 3, or any other number desired, to subdivide the decoder PROMs and the auxiliary memory into additional sections to provide further patching capability.

The disclosed embodiment of the invention illustrates a three stage binary counter having separate output conductors extending from each stage to three separate inputs of each decoder PROM as well as to three separate inputs of the auxiliary memory. These three conductors from the counter supplement the address bits supplied to the decoder PROMs by the memory address bus conductors. The counter output bits also supplement the address bits applied to the auxiliary memory by the encoder. The three bits supplied by the counter can assume 8 different binary states. They therefore effectively subdivide the decoder PROMs and the auxiliary memory into 8 different sectors to permit 8 different sets of patches to be detected with each set having 8 words. This, of course, assumes that the decoder PROMs are of an 8-bit width.

The binary counter is normally in a reset state in which its three output conductors apply a binary 000 to address the inputs of the decoder PROMs as well as to the auxiliary memory. When a ROM address is applied to the memory address bus, the system of which the ROM is a part also applies a read signal to control circuitry associated with the 3-bit counter. This read signal activates the counter after a predetermined time delay so that it begins stepping sequentially through its various binary states. If the ROM address currently applied to the memory address bus is to be patched and if this patch is located in sector 000, the first set of patched addresses, the counter control circuitry is immediately disabled and it does not step out of its position 000. However, if the currently applied ROM address is not in the first set of patches, the counter steps out of position 000 and then from position to position until the currently received ROM address is either detected by the decoder PROMs or until the counter cycles through all of its positions and returns to its initial position of 000.

Let it be assumed that a ROM address appearing on the address bus is in a PROM sector defined by an intermediate position of the counter such as 101. This address is then detected by the decoder PROMs when the counter steps to its position 101. The binary output bits of the counter at that time effectively steer the decoder PROMs to the sector associated with address bits 101. The address bits which are supplied to the PROMs by the address bus conductors identify which patch in sector 101 has been detected. A decoder output signal representing this patch is applied in 1-out-of-8 form to the encoder which converts it to binary and applies it to the auxiliary memory.

The binary information from the encoder and the binary bits 101 from the counter together uniquely specify the location within the auxiliary memory that contains the program information the system requires at this time in place of that in the currently addressed defective ROM location being patched. The system returns a memory complete signal to the counter control circuitry to restore the counter to its reset position after the system has received the valid program information it requires from the auxiliary memory.

Features

A feature of the invention is the provision of a ROM patching facility which uses a plurality of small capacity PROMs which are jointly controlled by a binary counter and by ROM address bits to detect a plurality of sets of address words representing defective ROM address locations.

A further feature is that each of the PROMs receives address information from conductors of a system address bus as well as output conductors of the binary counter.

Another feature is that each of the output conductors of the binary counter are connected to separate address inputs on all of the PROMs as well as separate address inputs on an auxiliary memory.

Yet another feature is the provision of circuitry for paralleling the corresponding output conductors of the plurality of PROMs to provide a distinctive 1-out-of-$n$ type signal whenever an address word is received representing a defective ROM location that is to be patched.

A further feature is the provision of an encoder which is connected to the PROM output conductors, which receives each 1-out-of-$n$ type decoder output signal, and which encodes each such signal into a binary word representing address information for an auxiliary memory.

A further feature is that the auxiliary memory stores the valid program information that is to be used when a defective ROM address word to be patched is received and that the auxiliary memory is addressed by the bit information provided to it jointly by the encoder as well as the counter.

A further feature is the provision of control circuitry including the encoder which responds to the reception of each decoder output signal, inhibits the output of the defective ROM, and outputs the currently addressed information in the auxiliary memory.

Description of the Drawing

These and other objects, advantages, and features of the invention may be more readily understood upon a reading of the following description of an exemplary embodiment of the invention taken in conjunction with the drawing in which:

FIG. 2 through 5 together disclose one possible manner in which the decoder PROMs of FIG. 1 could be programmed.

Description

Figure 1:
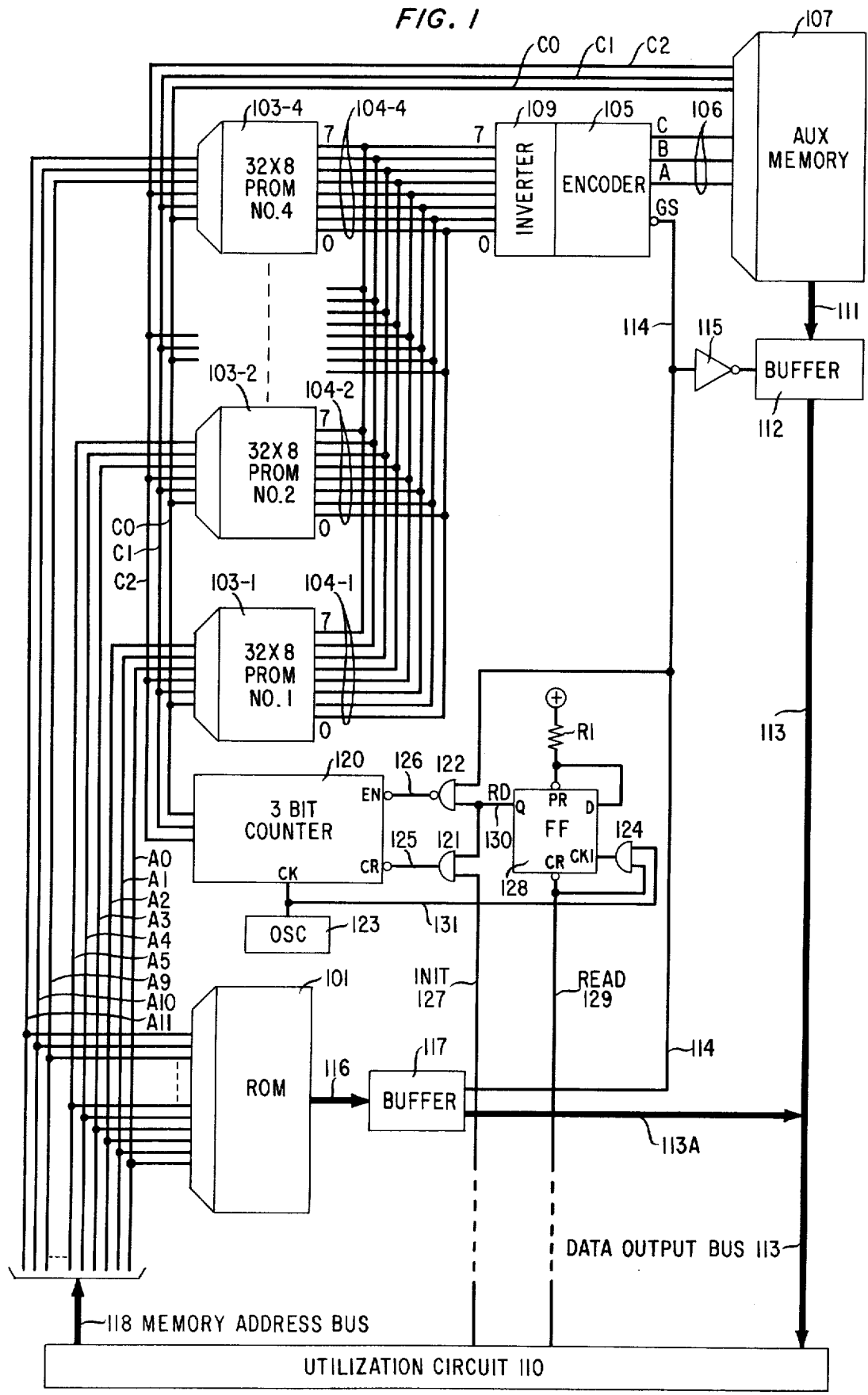
FIG. 1 discloses one possible embodiment of the invention which provides facilities for 64 patches.

A memory system embodying the invention is shown on FIG. 1 as comprising a memory address bus 118, a ROM 101 which is the main memory of the system and which is assumed to have the defective locations that are to be patched, a buffer 117 which receives the output signals from the ROM, and an output bus 113 which receives the ROM output signal via buffer 117 and extends these signals to the utilization circuit 110. Circuit 110 may comprise the remainder of the system elements, including a processor, that are associated with and/or controlled by the memory system of FIG. 1.

In normal operation, the utilization circuit 110 applies address word information to the ROM via the memory address bus 118 and receives the contents of each word read out of the ROM. This information is received from the ROM via path 116, buffer 117, path 113A and the data output bus 113. Buffer 117 is normally enabled by the high on its control conductor 114. During such times, the buffer effectively interconnects paths 116 and 113A signalwise.

The patching facilities provided in accordance with the embodiment of the invention shown on FIG. 1 further include four 32 × 8 PROMs 103-1 through 103-4, an encoder 105 which includes inverter 109, auxiliary memory 107, buffer 112, and counter 120 having output conductors C0, C1, and C2. Conductors C0, C1, and C2 extend to three address inputs on each of PROMs as well as to three address inputs on auxiliary memory 107. The conductors of bus 118 are connected to the remaining address inputs of PROMs 103 with conductors A0 – A2 being connected to PROM 103-1, conductors A3 – A5 being connected to PROM 103-2, conductors A6 – A8 being connected to PROM 103-3, and with conductors A8 – A11 being connected to PROM 103-4. Each PROM stores 8-bit words, each PROM has eight output conductors designated 0 through 7, the corresponding output conductors of the three PROMs are connected in parallel with each other, and they extend to a different input on encoder 105 via inverter 109.

The three PROMs together are programmed to detect up to eight sets of eight different ROM address words on bus 118. The eight words of the first set are detected when the binary bits from the counter are 000; the eight words of the next set are detected when bits from the counter are 001; and so on for the remaining sets up to and including the eighth set when the counter bits are 111. Each of the eight address words within a set is functionally associated with a unique bit order within each of the three PROMs. Each PROM output conductor is also uniquely associated with a unique bit order of its PROM. For example, PROM output conductors 0 are associated with the rightmost, the lowest, bit order or position so that when a PROM word is read out, the contents of the rightmost bit of the word are applied to output conductor 0.

Each of the output conductors of each PROM is functionally associated with one of the address words of each of the eight sets of words that can be patched. Output conductor 0 of each PROM is functionally associated with the address of the first word of each set that can be patched, and a binary 1 is written into the rightmost bit of the word location in each PROM that is accessed when the first patched address of a set appears on bus 118. Consequently, whenever this word is received, a binary 1 is read out as the rightmost bit of each PROM and is applied to its output conductor 0.

The corresponding output conductors of the PROMs are wired in parallel and the internal circuitry of the PROMs is such that a set of paralleled output conductors can go high only when each PROM drives its output conductor of this set high in response to the storage of a binary 1 in the associated bit order of the word being read out. A binary 0 (a low) read out on an output conductor of one PROM will hold the corresponding output conductors of the other two PROMs low even though these other two PROMs currently read out a 1.

In this manner, output conductor 0 of each of the three PROMs is associated with the address of the first ROM word in each of the eight different sets that can be patched. The other seven output conductors of each of the PROMs are associated with seven other ROM words that can be patched in each set. The patching capacity of this arrangement is therefore 64 ROM address words since each PROM can provide eight patches for each of the eight possible binary states of conductors C1, C2, and C3.

From the above, it can be seen that the three PROMs together generate 1-out of-8 type information as each patched address of a set is received. A 1-out of-8 signal on any output conductor 0 through 7 can represent a patched address in any one of the eight sets of eight words that can be detected by the PROMs. This signal is therefore ambiguous in that it does not uniquely identify which of the eight possible ROM words that can be patched have been detected. The encoder receives each decoder output signal, encodes it into binary, and applies the binary information as address bits to the auxiliary memory 107 which may be a PROM. The address bits from the decoder are used by auxiliary memory together with the address bits applied by conductors C0, C1, and C2. These six address bits together uniquely identify which of the 64 possible patched addresses have been detected. These eight bits address the word in memory 107 that contains the valid program information that is to be used at this time as a substitute for that in the currently addressed defective ROM location.

The encoder 105 has a GS output terminal which is normally high but which goes low whenever the encoder receives a high from the decoder PROMs on any of its input conductors 0 through 7. The low on terminal GS is applied over conductor 114 to buffer 117 to inhibit it so that the ROM signals to path 116 are not extended via buffer 117 to the data output bus 113. The low on path 114 is also inverted by circuit 115 and applied as a high to enable buffer 112. This causes the auxiliary memory output signals on path 111 to be extended through buffer 112 to data output bus 113.

With reference to the above, let it be assumed that the 64th ROM word that can be patched is received from the utilization circuit 110 and applied to address bus 118. The counter now advances from position to position until it reaches its position 111. At that time, the counter output bits of 111 on the C- conductors and the bits of the ROM address specify one of the eight different locations in each PROM 103 that has a binary 1 stored in its leftmost bit. Each PROM 103 now reads out a binary 1 to drive its output conductor 7 high. The encoder receives this high on its input conductor 7 and encodes it into a binary 7. This binary 7 is applied via conductors 106 to the auxiliary memory 107 which now also receives a binary 111 on conductors C0, C1, and C2. The six binary 1s provided by the encoder 105 and conductors C0, C1, and C2 together access the word location in memory 107 that currently stores the good information the utilization circuit 110 requires at this time in place of that in the currently addressed defective location of ROM 101.

The encoder now applies a low to conductor 114 to disable buffer 117 and enable buffer 112. This causes the information currently being read out of the auxiliary memory 107 to be applied to data output bus 113 and extended to the utilization circuit 103 in place of the defective information in the ROM memory.

The following describes the operation of counter 120 and its control circuitry. The counter is normally in its reset or 000 position. The counter is forced to its reset state in response to a low on its input terminal CR from conductor 125 which is the output of AND gate 121. The flip-flop 128 is normally in a reset state in which its Q output is low. This low is extended over path 130 to the upper input of AND gate 121 to hold its output low and, in turn, to hold the counter in its reset state. The counter can also be reset by conductor 127. This conductor is normally high but it is driven low whenever power is initially applied to the system. This low is extended through AND gate 21 to the CR input of the counter to reset it.

The oscillator 123 is of the free running type and its output signals are applied to the CK input of the counter. However, the counter only responds to the oscillator signals when the counter EN input is low. Conductor 130 extending to the lower input of AND gate 122 is normally low. This maintains the output of the AND gate high and this high is applied over conductor 126 to the counter EN input to prevent it from responding to the oscillator signals.

The READ signal on path 129 is switched from a low to a high when the utilization circuit 110 applies a ROM memory address word to bus 118. The READ signal is made high at this time so that, under normal conditions, the system can receive the program information that is read out of the ROM memory.

The READ signal going high is applied to the lower input of AND gate 124 and, when the signal from oscillator 123 goes high, the AND gate 124 turns on and applies a high to the CK1 input of flip-flop 128. This high sets the flip-flop and drives its Q output high. This high is extended over path 130 to the lower input of AND gate 122. The GS conductor, extending to the upper input of this AND gate is normally high. Therefore both inputs of the gate are now high and its output is switched to a low to enable the counter so that it can respond to the output signals of oscillator 123.

The response time of the circuitry of FIG. 1 following the application of the READ signal on path 129 is sufficient that the PROM decoder circuitry has time to determine whether an address applied to bus 118 represents a ROM location that is to be patched by the first sector of the decoder PROMs. This sector is defined or addressed defined by the bits 000 being applied to the C- conductors by the counter and, in turn, to the lower three address input on each of PROMs 103 as well as to the address inputs of auxiliary memory 107.

Let it first be assumed that the ROM address currently applied to bus 118 is not a patched address in sector 000 of the PROMs. This being the case, the GS conductor from encoder 105 remains high and the counter steps from its position 000 to 001 upon the next positive transition of the output from oscillator 123. The counter then applies a 001 over the C- conductors to the lower three address inputs of each of the decoder PROMs. This permits them to determine whether the ROM address signals on bus 113 represent a patched address located in sector 001 of the PROMs.

The circuitry of FIG. 1 and the counter 120 operate in this manner with the counter advancing on each positive transition of the oscillator output and with the decoder PROMs performing a search for a patched ROM address in each of their various sectors as the counter 120 advances from position to position to define the 8 possible binary states of conductors C0, C1, and C2.

Let is be assumed that the ROM address currently applied to bus 118 is not an address that is to be patched and, that instead, it represents a ROM location containing good information that is to be used at this time by the system. In this case, the ROM applies its output information over path 116, buffer 117, which is enabled at this time, and over paths 113A and 113 back to the utilization circuit 110 where this information is used by the system. The counter 120 may cycle one or more times while the ROM is transmitting its output information back to the system. The number of cycles or partial cycles through which the counter steps at this time is immaterial since the address information on bus 118 is not an address that is to be patched.

The system 110 switches the READ conductor 129 from a high to a low after it has received and registered the output information from the ROM memory. This low on conductor 129 extends to the CR input of the flip-flop to reset it. This drives the Q output of the flip-flop low. This low is extended over path 130 to the lower input of AND gate 122 to drive its output high. This disables the counter so that it can no longer respond to the drive signals from the oscillator. The low on path 130 is also extended to the upper input of AND gate 121 to drive its output low and reset the counter.

Let it next be assumed that the address applied to bus 118 represents a defective ROM location that is to be patched. The circuit operation proceeds in the manner described, the counter steps from position to position until the binary bits applied to conductors C0, C1, and C2 specifies the sector of the decoder PROMs in which the patched address is located. Let is be assumed, for example, that this ROM address is located in the last sector of the PROMs, which is defined by the binary bits 111 being applied to the lower three inputs of each of the PROMs 103 by conductors C0, C1, and C2.

The advancement of the counter to its position 111 causes this pattern of bits to be applied to the lower three decoder PROM address inputs. These three bits and the address bits applied to each decoder PROM by the A-conductors permits the decoder PROMs to detect the patched address. Each decoder PROM drives its output conductor high that is associated with the patched address. As already described, the PROMs are programmed in such a manner that each patched address of a set is associated with a different one of the bit orders within the PROM. A 1 is inserted into this bit order of the PROM location accessed by the patched address bits. EAch decoder drives its output conductor high that is associated with this bit order when its patched address bits are received. The corresponding output conductors of each PROM are now driven high and they apply this in 1-out of-8 format to the encoder. The encoder encodes this 1-out of-8 signal into binary and applies it as address information over path 106 to the auxiliary memory 107.

The bits 111 from the counter are also applied over the C- conductors as address information to the auxiliary memory at this time. The 3-bits supplied by C-conductors and the 3-bits supplied by the encoder 105 together address the word in the auxiliary memory that contains the good program information the system requires at this time in place of that in the defective ROM location specified by the patched address.

The GS output of the encoder is driven low when it receives a 1-out of-8 signal from the decoder PROMs. This low inhibits the buffer 117 so that the defective information in the ROM cannot be received by the system. This low also is inverted by element 115 to enable buffers 112 so that good program information in the auxiliary memory can be used at this time by the system.

The timing of this circuitry within the system 110 that receives and registers the program information from bus 113 is such that it does not activate its circuitry to register the program information from bus 113 until a time delay equal to that required for the counter to complete one cycle of its operation. The timing is designed in this manner so that the system will not falsely respond to defective information received from the ROM memory during conditions under which a word applied to bus 118 represents a patch in the last sector of the decoder PROMs. In such cases, the ROM 101 may initially respond and put out defective information while the counter is advancing from its reset position to its position 111. The utilization circuit ignores any program information received on bus 113 prior to a time delay equal to that required for the counter to step from its reset position to its position 111.

The system receives the information on bus 113 and switches and READ conductor 129 from a high to a low state. This resets flip-flop 128, which in turn resets the counter by applying a low to the CR input and disables the counter so that it can no longer respond to the oscillator signals by driving its EN input high.

FIG. 2, 3, 4, and 5 together illustrate the manner in which the four PROMs 103- would be programmed to provide a first set of eight different patches. The left column of each FIG. specifies the patch number, the second and third columns indicate the address bus and counter output bits received by each PROM for each patch, the right hand column indicates the manner in which the PROMs are programmed to generate the eight patch signals.

With reference to FIG. 2, which illustrates typical programming for PROM 1, it can be seen that the PROM 1 location associated with patch 0 is accessed upon the receipt of the A- conductor binary bits 001. From the right column of FIG. 2 it can be seen that a binary 1 is written in the rightmost bit position of this word. On FIG. 3 it can be seen that the PROM 2 location associated with patch 0 is accessed by the A- conductor bits 010 and that a binary 1 is stored in the rightmost bit position of this word. On FIG. 4 it can be seen that the PROM 3 word associated with patch 0 is accessed by the A- conductor bits 100 and that a binary 1 is stored in the rightmost bit position of this word. On FIG. 5, the A- conductor bits for patch 0 and PROM 4 are 000 and a 1 is written in the rightmost bit position of this word.

A binary 1 is applied by each PROM to its output conductor 0 when the A- conductor address bits for patch 0 are received by the three PROMs. This drives the paralleled output conductors 0 high, and this high extends into input conductor 0 of the priority encoder where it is encoded into binary and subsequently used as address information by auxiliary memory 107.

A PROM location may be programmed to have a binary 1 in a plurality of bit positions if the address bits that access this PROM word are associated with a plurality of ROM addresses to be patched. This is illustrated on FIG. 2 for patches 2 and 3. The A- address bits received by PROM 1 for both of these patches is 010 and a binary 1 is written into bit positions 2 and 3 of the PROM location accessed by bits 010. The address bits applied to PROMs 2, 3, and 4 are different for patches 2 and 3 and, therefore, different ROM word locations are patched even though the same three bits (A0 - A2) are applied to PROM 1.

It should be noted that the C- counter bits are applied as address information to each of the four PROMs and that these bits are 000 for all eight patches of the first set as shown on FIG. 2, 3, 4, and 5. When a ROM address associated with one of the first eight patches is received, each of the four PROMs applies a high, a binary 1, to the one of its output conductors that is associated with this particular patch. Since each of the four PROMs are programmed to have a 1 in the corresponding bit order for each patch, all four PROMs drive their corresponding output conductors high, these output conductors are paralleled, and this high is extended to the encoder as a 1-out of-8 signal where it is converted into 3-bit binary information for the auxiliary memory. The C-conductors at this time apply a binary 000 as additional bits of address information to the auxiliary memory. The three bits supplied by the C-conductors and the three bits supplied by encoder output conductors 106 uniquely define the word location in the auxiliary memory that contains the good program information the system is to use at this time in place of that in the defective ROM location being patched.

FIG. 2 through 5 pertain to the first set of 8 patches, namely patches 0 through 7, that the four decoder PROMs 103 can detect. The address bits appearing on conductors C0, C1 and C2 from the counter are 000. These C- conductor bits remain 000 for all 8-bits of the first set.

The counter advances from its reset position 000 to its position 001 whenever a patched address is not found in sector 000 of the PROMs. The counter applies the bits 001 to the C- conductors at this time for all 8 patches of the next set, namely patches 8 through 15. In a similar manner, the counter may advance to its remaining positions, apply and the appropriate binary bits to the C- conductors to permit the other sets of patches to be detected.

The 4 PROMs would be programmed for each of the other sets of 8 patches each in a manner similar to that shown on FIG. 2 through 5 for the first set. In other words, each PROM would have a 1 in its 0 bit order for its location that is addressed to be the first patch of each of the other sets. Similarly, the PROMs would have a 1 in their other bit orders as shown in FIG. 2 through 5 to detect the other patches in the other sets.

The address bits applied by the A- conductors for the patches of the other sets may be of any bit pattern required and would be dictated by the address of the defective ROM locations to be patched.

The C- conductor bits would be 001 through 111 for the second through the eighth set of patches that the embodiment of FIG. 1 can accommodate.

The programming of the PROMs for the other sets of patches as well as the A- and C- conductor bits applied to the PROMs as address information for these other patches is not illustrated on the drawing since it is merely an extension of that shown on FIG. 2 through 5.

The four PROMs 103-, and the auxiliary memory 107 may be IM 5160 type devices. They are field programmable. The encoder 105 may be a TI SN 74148 type device. The inverter 109 may be a SN 7406 device.

The PROMs apply a high potential to their output conductors to indicate an active state, the encoder responds to a low as an active signal. In order to make the PROMs and the encoder compatible, the inverter 109 is shown and its sole function is to invert the highs representing active output PROM signals to the lows required by the encoder. The inverter may be a TI SN 7406 type device. This inverter is shown as part of the encoder since it is of no significance to the present invention other than to make the PROM output signals compatible with the encoder.

What is claimed is:

1. A circuit for patching defective locations of an unalterable memory (ROM) containing invalid program information in response to the receipt of ROM address words specifying said defective locations, said circuit comprising; a plurality of alterable memories (PROMs) each having a first and a second group of address inputs, means for applying the bits of said ROM address words to said first group of PROM inputs with each bit being applied to only a single input of said PROMs taken collectively, a plural order counter, means for connecting each order of said counter to a different input of said second group on each one of said PROMs, said connecting means being effective to apply counter output signals representing the current position of said counter to the inputs of said second group, a plurality of output conductors on each of said PROMs each of which corresponds to a different bit order within a PROM, means for connecting in parallel the output conductors representing corresponding bit orders for each of said PROMs, means in said PROMs for associating each set of said paralleled output conductors with a unique combination of said defective locations with each location being associated with only a single set, said PROMs being responsive to the concurrent receipt of an address word specifying a defective ROM location and to said counter output signals to apply a patch signal to the one set of said output conductors associated with said specified location, an auxiliary memory, an encoder responsive to said patch signal for applying encoded address information to said auxiliary memory, and means for applying said counter output signals to said auxiliary memory, said auxiliary memory being responsive to said encoded address information and said counter output signals for generating valid program information as a substitute for that stored in said specified defective ROM location.

2. The circuit of claim 1 wherein each one of the defective locations associated with each set of said paralleled output conductors is unique to a different position of said counter, said circuit further comprising; means for advancing said counter from position to position upon the receipt of a ROM address word to control the generation of a patch signal by said PROMs whenever a received address word specifies a defective location.

3. The circuit of claim 2 wherein said counter output signals are effective to define a unique sector of said PROMs for each position of said counter, and means for stopping said counter upon the generation of a patch signal so that the counter output signals representing the current position of the said counter define a sector of said PROMs unique to the currently received ROM address specifying a defective location.

4. The circuit of claim 1 in combination with; means for applying each address word to said ROM to read out the ROM program information associated with each applied address word, means for normally applying the program information read out of said ROM to a data output bus, means responsive to said patch signal for applying the valid program information generated by said auxiliary memory to said data output bus, and further means responsive to said patch signal for preventing said ROM from applying to said output bus the invalid program information in the currently addressed one of said defective ROM locations.

5. A circuit for patching up to $j2^{m2}$ defective locations of an unalterable memory (ROM) containing invalid program information in response to the receipt of $m1$ bit ROM address words specifying said defective locations, said circuit comprising; a plurality of alterable memories (PROMs) each having a first and a second group of address inputs, means for applying $m1$ bits of each received ROM address word to said first group of PROM inputs with each $m1$ bit being applied to only a single input of said PROMs taken collectively, a binary counter having $m2$ orders, means connecting each order of said counter to a different input of said second group on each of said PROMs, said connecting means being effective to apply $m2$ bits representing the current position of said counter to the inputs of said second group on each one of said PROMs, $j$ output conductors on each of said PROMs each of which corresponds to a different bit order within a PROM, means for forming $j$ sets of output conductors by connecting in parallel the output conductors representing corresponding bit orders for each of said PROMs, means in each of said PROMs for associating each set of paralleled output conductors with a unique combination of $2^{m2}$ defective locations with each location being associated with only a single set, said PROMs together being responsive to the concurrent receipt of an $m1$ bit address word specifying a defective ROM location and $m2$ bits from said counter to apply a patch signal to the one set of said output conductors associated with said specified location, an auxiliary memory, an encoder responsive to said patch signal application for applying encoded address information to said auxiliary memory, and means for applying said $m2$ bits from said counter to said auxiliary memory, said auxiliary memory being responsive to said encoded address information and to said $m2$ bits representing the current position of said counter for generating valid program information as a substitute for that stored in said specified defective ROM location.

6. The combination of an unalterable memory (ROM) having at least $j2^{m1}$ different word locations some of which are defective and contain invalid program information, and a circuit for patching up to $j2^{m2}$ defective ones of said locations to provide valid program information in response to the receipt of $m1$ bit ROM address words specifying said defective ROM locations, said combination comprising; an address bus having at least $m1$ conductors which are connected to $m1$ address inputs of said ROM, control means for applying address words to said bus representing locations of said ROM contained program information that is to be read out, means for receiving the program information read out of each ROM location upon the reception of an address word and for normally extending said information over an output bus to said control means, a plurality of alterable memories (PROMs) each having a first and a second group of address inputs, means for connecting $m1$ conductors of said first group whereby each bus conductor is connected to a single input of said PROMs taken collectively, a binary counter having $m2$ orders, means for connecting each order of said counter to a different input of said second group on each of said PROMs, said connecting means being effective to apply $m2$ bits representing the current position of said counter to the inputs of said second group on each PROM, $j$ output conductors on each of said PROMs each of which corresponds to a different bit order within a PROM, means for forming $j$ sets of output conductors by connecting in parallel the output conductors representing corresponding bit orders for each of said PROMs, means in each of said PROMs for associating each set of said paralleled output conductors with a unique combination of $2^{m2}$ defective locations with each location being associated with only a single set, said PROMs together being responsive to the concurrent receipt of an $m1$ bit address word specifying a defective ROM location and $m2$ bits from said counter to apply a patch signal to the one set of said output conductors associated with said specified location, an auxiliary memory, an encoder responsive to said patch signal application for applying encoded address information to said auxiliary memory, and means for applying said $m2$ bits from said counter to said auxiliary memory to specify the current position of said counter, said auxiliary memory being responsive to said encoded address information and to said $m2$ bits for generating valid program information as a substitute for that stored in said specified defective memory location.

7. The combination of claim 6 wherein said combination further comprises; means responsive to said patch signal for applying the output information from said auxiliary memory over said output bus extending to said control means, and further means responsive to said patch signal for preventing said ROM from applying to said output bus the invalid information in said currently addressed defective ROM location.

8. The circuit of claim 7 wherein each one of the defective locations associated with each set of paralleled PROM output conductors is unique to a different position of said counter, said circuit further comprising; means for advancing said counter from position to position upon the receipt of a ROM address word to control the generation of a patch signal by said PROMs whenever a received address word specifies a defective location.

9. The circuit of claim 8 wherein said counter output signals are effective to define a unique word sector for said PROMs for each position of said counter, and means for stopping said counter upon the generation of a patch signal so that the counter output signals representing the current position of the said counter define a sector of said PROMs unique to the currently received ROM address specifying a defective location.

10. A circuit for detecting the receipt of $j2^{m2}$ predetermined different address words each having $m1$ bits, said circuit comprising; a plurality of alterable memories (PROMs) each having a first and a second group of address inputs, means for applying $m1$ bits of each received address word to said first group of PROM inputs with each $m1$ bit being applied to only a single input of said PROMs taken collectively, a binary counter having $m2$ orders, means connecting each order of said counter to a different input of said second group of said PROMs, said connecting means being effective to apply $m2$ bits representing the current position of said counter to the inputs of said second group on each of said PROMs, $j$ output conductors on each of said PROMs each of which corresponds to a different bit order within a PROM, means for forming $j$ sets of output conductors by connecting in parallel the output conductors representing corresponding bit orders for each of said PROMs, means in each of said PROMs for associating each set of said paralleled output conductors with a unique combination of $2^{m2}$ preselected one of said address words with each word being associated with only a single set, said PROMs together being responsive to the concurrent receipt of one of said preselected address words and $m2$ bits from said counter to apply a patch signal to the one set of said output conductors associated with said one received word, an auxiliary memory, a utilization circuit, and means for apply said patch signal and said $m2$ counter bits to said auxiliary memory to define said one received address word said auxiliary memory being responsive to said patch signal and said $m2$ bits to transmit information to said information to said utilization circuit.

11. The method of patching defective word locations containing invalid information in an unalterable memory (ROM) upon the receipt of ROM address words specifying said defective locations, said method comprising the steps of;
   receiving said ROM address words, applying the bits of each received word to different address inputs on alterable memories (PROMs) with each one of said address bits being applied to only a single input of a single PROM, applying $m2$ bits from a counter to $m2$ different address inputs on each PROM with each $m2$ bit being applied to every PROM, said $m2$ bits together representing the current position of said counter, connecting in parallel the PROM output conductors representing corresponding bit orders in each of said PROMs, programming said PROMs to associate each set of said paralleled output conductors with a unique combination of said address words representing different defective ROM locations with each location being associated with only a single set, said programmed PROMs together being responsive to the receipt of a ROM address word specifying one of said defective locations to apply a patch signal to the set of said output conductors associated with said one specified location, encoding each applied patch signal into address information for an auxiliary memory, applying said encoded address information and said $m2$ bits from said counter to said auxiliary memory, and controlling said auxiliary memory with said encoded address information together with said $m2$ bits to generate valid program information as a substitute for that stored in said specified defective ROM location.

12. The method of claim 11 wherein each one of the defective locations associated with each set of PROM output conductors is unique to a different position of said counter, said method further comprising the steps of;

advancing said counter from position to position upon the receipt of a ROM address word to control the generation of a patch signal whenever a received address word specifies a defective location, and stopping said counter upon the generation of a patch signal so that the counter output signals representing the current position of the said counter define sector of said PROMs unique to the currently received ROM address specifying a defective location.

13. The method of claim 12 in combination with the additional steps of;

applying all bits of each of said address words to said ROM, reading program information out of said ROM upon the receipt of each address word, normally applying the program information read out of said ROM to a data output bus extending a system control, isolating said ROM from said output bus upon the generation of said patch signal to prevent the invalid program information read out of said specified defective ROM location from being applied to said output bus, and applying to said output bus under control of said patch signal the valid program information generated by said auxiliary memory.

14. The method of patching $j2^{m2}$ defective word locations containing invalid information in an unalterable memory (ROM) upon the receipt of ROM address words specifying said defective locations, said method comprising the steps of;

receiving $m1$ bit ROM address words, applying each address word to $m1$ different address inputs on $n$ alterable memories (PROMs) with each one of said $m1$ bits being applied to only a single input of said PROMs taken collectively, applying $m2$ bits from a counter to $m2$ different address inputs on each PROM with each $m2$ bit being applied to every PROM, said $m2$ bits together representing the current counting position of said counter, connecting in parallel the PROM output conductors representing corresponding bit orders in each of said PROMs with each of said PROMs having $j$ orders and $j$ output conductors, programming said PROMs to associate each set of said paralleled output conductors with a unique combination of $2^{m2}$ of said address words representing different defective ROM locations with each location being associated with only a single set, said programmed PROMs together being responsive to the receipt of a ROM address word specifying one of said defective ROM locations to apply a patch signal to the set of said output conductors associated with said one specified location, advancing said counter from position to position upon the reception of each ROM address word, stopping said counter upon the generation of said patch signal so that the current position of the counter and said patch signal together uniquely define said address word, encoding each applied patch signal into address information for an auxiliary memory, applying said encoded address information and said $m2$ bits from said counter to said auxiliary memory, and controlling said auxiliary memory with said encoded address information together with said $m2$ bits to generate valid program information as a substitute for that stored in said specified defective ROM location.

* * * * *